G. H. LANG.
DEVICE FOR PRODUCING ACTUATING IMPULSES.
APPLICATION FILED MAR. 10, 1916. RENEWED MAY 28, 1921.
1,383,549.
Patented July 5, 1921.
Fig. 1.
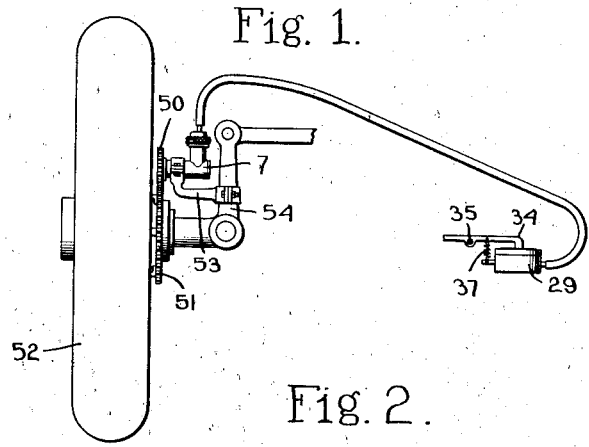
Fig. 2.
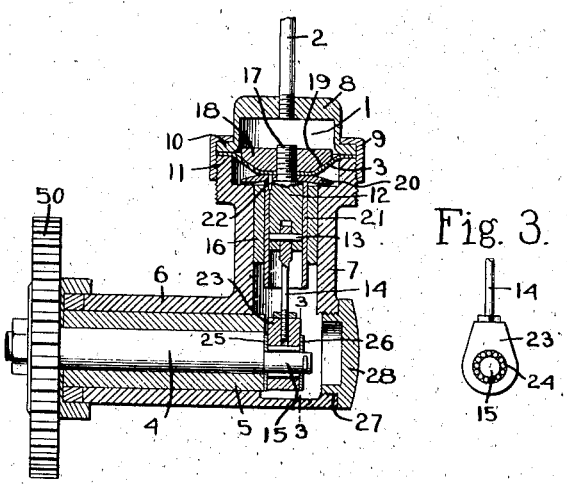
Fig. 3.
Fig. 4.
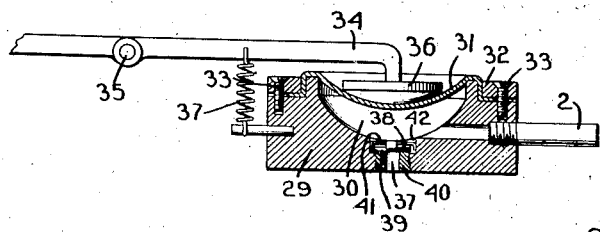
Inventor,
George H. Lang
by Heard Smith & Tennant
Attys

UNITED STATES PATENT OFFICE.

GEORGE H. LANG, OF BOSTON, MASSACHUSETTS, ASSIGNOR TO STOVER-LANG COMPANY, OF BOSTON, MASSACHUSETTS, A CORPORATION OF MASSACHUSETTS.

DEVICE FOR PRODUCING ACTUATING IMPULSES.

1,383,549. Specification of Letters Patent. Patented July 5, 1921.

Application filed March 10, 1916, Serial No. 83,415. Renewed May 28, 1921. Serial No. 473,320.

*To all whom it may concern:*

Be it known that I, GEORGE H. LANG, a citizen of the United States, residing at Boston, county of Suffolk, State of Massachusetts, have invented an Improvement in Devices for Producing Actuating Impulses, of which the following description, in connection with the accompanying drawing, is a specification, like characters on the drawing representing like parts.

In my Patent No. 1,128,695, dated February 16, 1915, I have illustrated and described a speed indicator which is adapted to be actuated by a pneumatic impulse-producing actuator comprising a transmitting impulse-producing member, a receiving member, and means providing a confined body of air between said members so that as said transmitting member is actuated the confined body of air will be vibrated, thus actuating the receiving member. It is the object of my present invention to provide a novel impulse-producing device adapted for use in connection with an indicator such as described in my above-mentioned patent.

In order to give an understanding of my invention I have illustrated in the drawings a selected embodiment thereof which will now be described, after which the novel features will be pointed out in the appended claims.

Figure 1 is a fragmentary view showing my improved impulse-producing device as it might be used in connection with a speed indicator for an automobile;

Fig. 2 is an enlarged sectional view through the impulse-transmitting member;

Fig. 3 is a section on the line 3—3, Fig. 2;

Fig. 4 is a sectional view through the impulse-receiving member.

The device herein shown is of that type which comprises two chambers connected by a pipe and each having a movable portion, one chamber constituting the impulse-transmitting member and being provided with means for moving the movable portion thereby to give the impulse to the body of air confined between said movable portions and the other chamber constituting the impulse-receiving chamber, the movable portion of said impulse-receiving chamber being vibrated or actuated through the air impulse and in turn actuating the part to be operated. The impulse-producing member is shown in Fig. 2 and it comprises an air chamber 1 with which communicates a pipe 2 leading to the air chamber of the impulse-receiving member. One end of the chamber 1 is formed by a diaphragm 3 which is vibrated from a rotating shaft 4 that is actuated by the part the speed of which is to be determined. In the present embodiment of my invention the shaft 4 is journaled in a bushing 5 which in turn is secured in the barrel portion 6 of a member 7. The air chamber 1 is formed within a cap 8 which is secured to the end of the body 7 by any suitable means such as a clamping ring 9. The edge of the diaphragm 3 is clamped between the flange 10 of the cap 8 and the end 11 of the member 7, thus making a tight joint. The diaphragm 3 may be vibrated from the shaft 4 by any suitable means. I have herein shown for this purpose a plunger 12 which is secured to the diaphragm and in turn is pivotally connected at 13 to one end of a connecting rod 14, the opposite end of which is connected to a crank pin 15 formed on the end of the shaft 4. This plunger 12 is mounted for reciprocation in a bearing bushing 16 which is secured in the member 7 and which will preferably be of a self-lubricating material, such, for instance, as wood that has been properly treated with oil to make it self-lubricating. The end of the plunger 12 is reduced in size and screw-threaded, as shown at 17, said screw-threaded end extending through the diaphragm 3 and having a nut 18 screw-threaded thereon, which nut has the rounded surface 19 with which the diaphragm has engagement. 20 is a disk or plate having a convex surface which is secured to the plunger 12 and which has bearing with the under side of the diaphragm 3. The plunger 12 is herein shown as provided with a lining or envelop 21 in the form of a tube which is rigid therewith and which has engagement with the bearing sleeve 16. The disk 20 is shown as held in place by a pin 22 that extends into the end of the plunger 12. I have herein shown an anti-friction bearing between the connecting rod 14 and the crank pin 15. This anti-friction bearing is in the form of a plurality of rollers 24 received between the crank pin 15 and the head 23 of the connecting rod 14, said rollers being held in place by washers 25, 26 carried by the crank pin. The member 7 is shown as provided with an opening 27 in line with the shaft 4 through which the crank pin end of the shaft is accessible. This opening is closed by a cap 28 screw-threaded in place.

The impulse-receiving member herein shown comprises a body member 29 having a chamber 30 therein with which the pipe 2 has communication and a diaphragm 31 which forms one side of the chamber. This diaphragm is shown as held in place by means of a clamping ring 32 which is secured to the body member 1 by screws 33.

34 represents an actuating element which is shown as pivotally mounted at 35 and is provided with a rounded head 36 bearing against the diaphragm 31. 37 is a spring acting on the actuating element 34 and tending to hold it in the position shown in Fig. 4.

With this device the movement of the diaphragm 3 upwardly will compress the air confined between the diaphragms, thus forcing the diaphragm 31 at the receiving end upwardly and actuating the member 34. When the diaphragm 3 moves downwardly the spring 37 will cause the element 34 to resume its initial position, thus forcing the diaphragm 31 downwardly. The element 34 will thus be vibrated in unison with the rotation of the shaft 4.

In devices of this nature it is important that the proper volume of air under the proper tension should always be maintained in the pipe 2 and chambers 1 and 30 in order that the element 34 may be properly operated. In order to provide for this I have formed the receiving member with an air inlet opening which is controlled by an automatically-operative valve so that if there is any loss of air in the confined volume of air this loss will be automatically made up by air which is drawn in through the air inlet. This air inlet opening is shown at 37 and it is controlled by an inwardly-opening check valve 38 resting on a valve seat 39. I have herein shown this valve seat as formed on the end of a bushing 40 that is screwed into the member 29. 41 represents a guard which is confined in the enlarged end 42 of the inlet port and which limits the opening movement of the valve. If during the operation of the device the air tension in the chambers 1 and 30 and pipe 2 drops below atmospheric pressure the valve 38 will be automatically opened, thus admitting an added quantity of air. With this arrangement the confined volume of air will always be kept at the required tension to permit the device to properly operate.

My invention is not only capable of use with the speed indicator of the type shown in my above-mentioned patent, but can be used in connection with various devices that are to be actuated by impulses. One practical use to which my invention may be put is that for operating a speed indicator for an automobile and when used in this way I propose to provide means for rotating the shaft 4 from one of the wheels of the automobile so that the shaft 4 will rotate in timed relation with the wheel. Any construction for driving the shaft 4 from the automobile wheel may be employed. In the drawings the shaft 4 is shown as provided with a gear 50 which meshes with a gear 51 mounted on the hub of the wheel 52 of an automobile. The transmitting member 7 may be supported in any way to preserve the proper driving connection between the gears 50 and 51. Where the transmitting member is attached to the front wheel of an automobile it may be sustained in a bracket 53 which in turn is secured to the steering connection 54.

I claim:

1. An impulse-producing member presenting an L-shaped casing, both arms of which are hollow, a driving shaft extending longitudinally of and journaled in one arm, said shaft terminating within the casing and having a crank pin at its inner end, said casing having an opening through which the crank pin is accessible, a plunger mounted for reciprocation in the other arm of the casing, a connecting rod connecting said plunger to said crank pin, a diaphragm connected to said plunger, a cap clamped to the end of the other arm and engaging the periphery of the diaphragm thereby clamping said diaphragm in place, said cap and diaphragm forming between them a chamber, a pipe leading from said chamber, and means to rotate the driving shaft.

2. An impulse-producing member presenting an L-shaped casing, both arms of which are hollow, a driving shaft extending longitudinally of and journaled in one arm, said shaft having a crank pin at its inner end, said casing having an opening at the angle in line with said driving shaft, a removable closure for said opening, a plunger mounted for reciprocation in the other arm of said casing, a connecting rod connecting said plunger to said crank pin, a diaphragm connected to said plunger, a cap clamped to the end of said other arm and engaging the periphery of the diaphragm thereby clamping said diaphragm in place, said cap and diaphragm forming between them a chamber, a pipe leading from the cap to an impulse-receiving member, and means to rotate the driving shaft.

In testimony whereof, I have signed my name to this specification.

GEORGE H. LANG.